United States Patent [19]

Cho

[11] Patent Number: 4,884,485
[45] Date of Patent: Dec. 5, 1989

[54] PLATE CUTTING DEVICE CAPABLE OF BEING USED TO CUT A PLATE ALONG A CURVE

[76] Inventor: Lucky Cho, P.O. Box 45-25, Taichung, Taiwan

[21] Appl. No.: 330,817

[22] Filed: Mar. 30, 1989

[51] Int. Cl.⁴ .............................................. B23D 19/08
[52] U.S. Cl. ....................................... 83/473; 83/497; 83/507; 30/98
[58] Field of Search ................. 83/596, 497, 496, 505, 83/507, 603, 494, 473, 482, 492; 30/98

[56] References Cited

U.S. PATENT DOCUMENTS 1,651,645 12/1927 Williams ............................ 83/497 X
4,694,574 9/1987 Dickinson ................................ 30/94

Primary Examiner—Donald R. Schran
Attorney, Agent, or Firm—Hoffman, Wasson, Fallow & Gitler

[57] ABSTRACT

A plate cutting device is provided which is capable of being used to cut a plate along a curve. It is a design directed to the disadvantages such as labor-consumption, awkwardness, incapability of cutting along a curve, and incapability of cutting a large size plate of conventional cutting tools.

The device is characterized in that it comprises a body associated with a curved frame, a toothed rolling wheel, and a cutting wheel. The two wheels are arranged slantly and are at a small distance from each other.

In plate work, a plate with a line drawn on it is put between the wheels and the ratchet rotating wheel above the rolling wheel is swung such that the toothed rolling wheel is rotated in the same direction and the teeth thereon grab into plate and cooperate with the cutting wheel to cut the plate. The cutting direction can be controlled simply by moving the plate in a suitable direction.

6 Claims, 5 Drawing Sheets

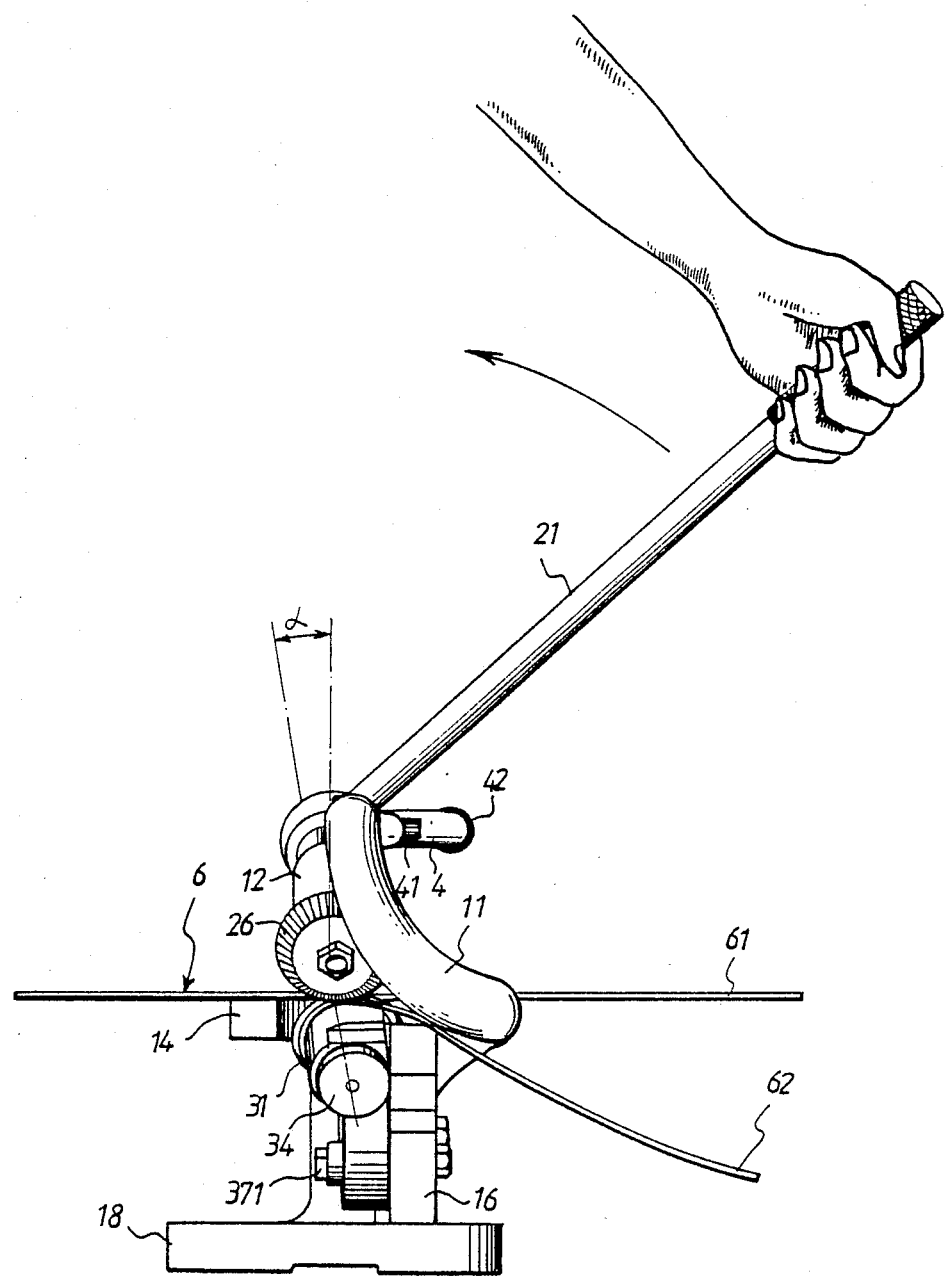
FIG_4

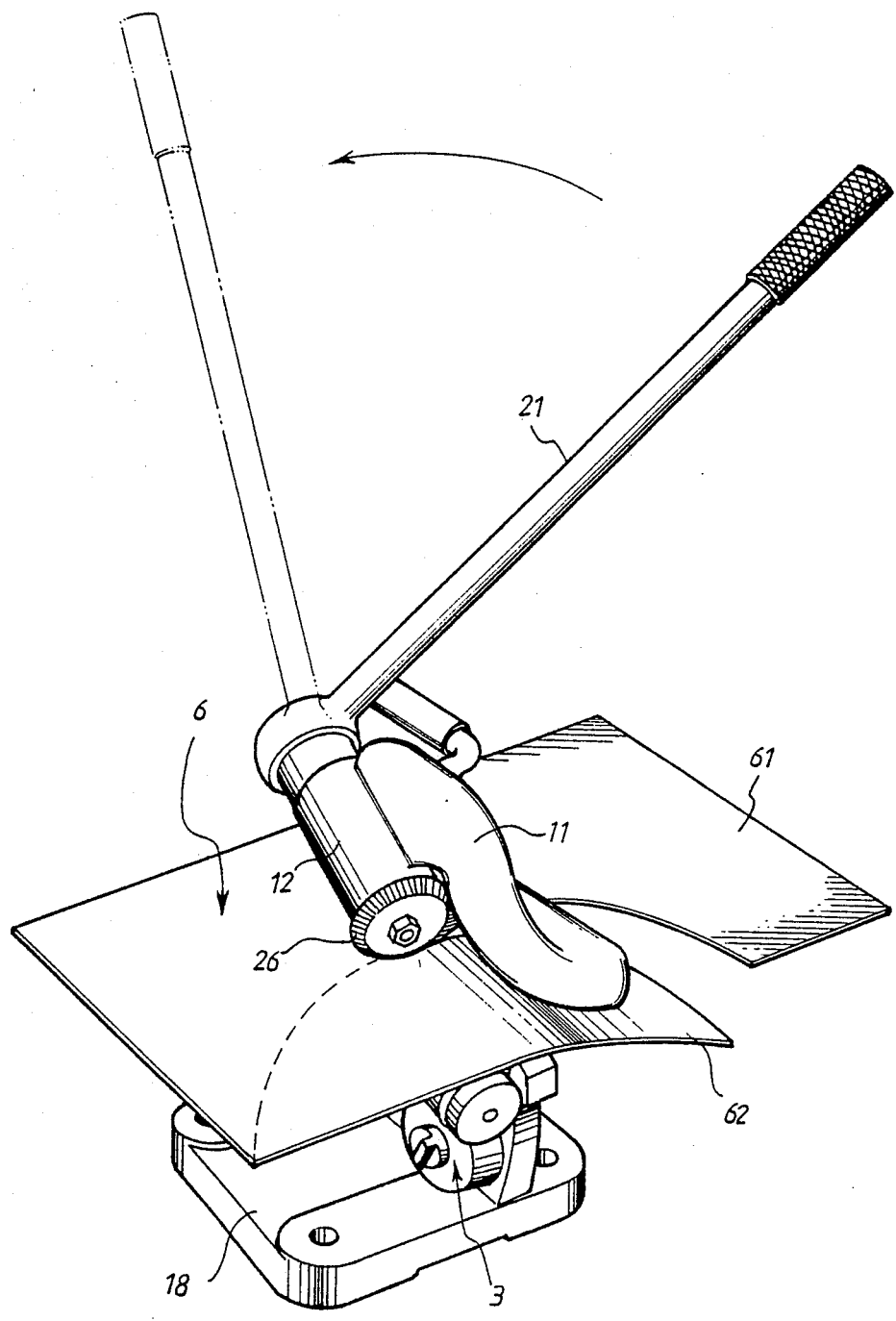
FIG_5

PLATE CUTTING DEVICE CAPABLE OF BEING USED TO CUT A PLATE ALONG A CURVE

SUMMARY OF THE INVENTION

This invention relates to a plate cutting device capable of being used to cut a plate along a curve. It is a creative design and also an improvement directed to the disadvantages such as labor-consumption, awkwardness, incapability of cutting along a curve, and incapability of cutting a large size plate...etc., of the sheers, pneumatic sheering machines, sheering presses, and electric sheering machines presently used by the plate workers. The device is characterized in that it comprises a body associated with a curved frame, a toothed rolling wheel, and a cutting wheel. A plate can be cut by the teeth and cutting edge of said wheels. Moreover, due to that the axes of the two wheels are at a suitable angle to each other, the tangent area between the wheels is reduced so that the device can be used to cut a plate smoothly along a curve as well as along a straight line.

BACKGROUND OF THE INVENTION

Conventional plate cutting tools includes sheers, sheering presses, pneumatic sheering machines, and electric sheering machines etc., wherein sheers are the oldest plate working tools. The operator exerts forces by his hand to sheer a plate. Extended handles i.e. arms of force can be used on sheers to save labor. Nevertheless, labor-intensive age has passed and the sheers have become backward tools. Moreover, various sizes of sheers are usually required for sheering the plates of various thicknesses, and straight and curved sheers are sometimes required for cutting out various shapes of plates. Furthermore, the users of sheers often feel troublesome and difficult in the plate. As to the sheer presses, they are used only for cutting large plates along straight lines. A round punch is used in a pneumatic sheering machine to punch out some material from a blank when the punch is moved in a vertical direction by highly compressed air. However, because of the big noises made in the operation of this kind of machine, the operator usually feels very uncomfortable. In addition, along the cutting line, a continuous burr forms. Because of the burr, additional dressing work usually is necessary. Moreover, because of the compressed air, an air compressor is needed. This causes higher cost and the machine consumes much power.

Concerning an electric sheering machine, it must be grasped by the operator using it. Not only the weight of the machine but also that of the plate are loaded in the hands of the operator. Therefore, the operator is apt to feel very tired. Moreover, the electricity consumption of the motor of an electric sheering machine forms an additional cost.

The afore-mentioned conventional plate cutting tools have many disadvantages such as awkwardness, labor-consumption, power-consumption, noises-making, and incapability of producing good products. In addition, they have no good sheering effects and their own specific functions. No any conventional plate cutting tool is multi-functional. Consequently, a plate worker usually must have various tools available. This not only increases costs but also lowers the efficiency of plate work.

In view of these disadvantages, the inventor made a lot of efforts in observation and experimentation, and eventually invented the plate cutting device capable of cutting a plate along a curve described herein. This device is simple to use, consumes no power, and integrate the effects of various cutting tools in one device so that it largely reduces the cost of purchasing the tools. Moreover, it can be used to cut a plate rapidly. Especially, it has very good effects in cutting a plate along a curve.

The primary object of the invention is to provide a plate cutting device which integrates the functions of cutting plates of various thicknesses along straight lines or curves so that the necessity of providing various cutting tools to cut the plates of various thicknesses along straight lines or curves can be eliminated.

Another object of the invention is to provide a highly labor-saving plate cutting device which can be used to cut various plates by the rolling of a toothed rolling wheel and a cutting wheel without the need of electric power.

Still another object of the invention is to provide a plate cutting device which makes no noises in use and can be used to produce quality products, especially there will be no burrs left along the cutting lines so that the cut plates need not to be dressed.

In order that the invention may be more fully understood, an embodiment thereof will now be described with reference to the accompanying drawings.

BRIEF DESCRIPTION OF THE DRAWINGS

FIG. 4 is a schematic plan view illustrating a cutting state of the invention; and FIG. 5 is a schematic view illustrating a cutting state of the invention.

DETAILED DESCRIPTION OF THE INVENTION

Figure 1:
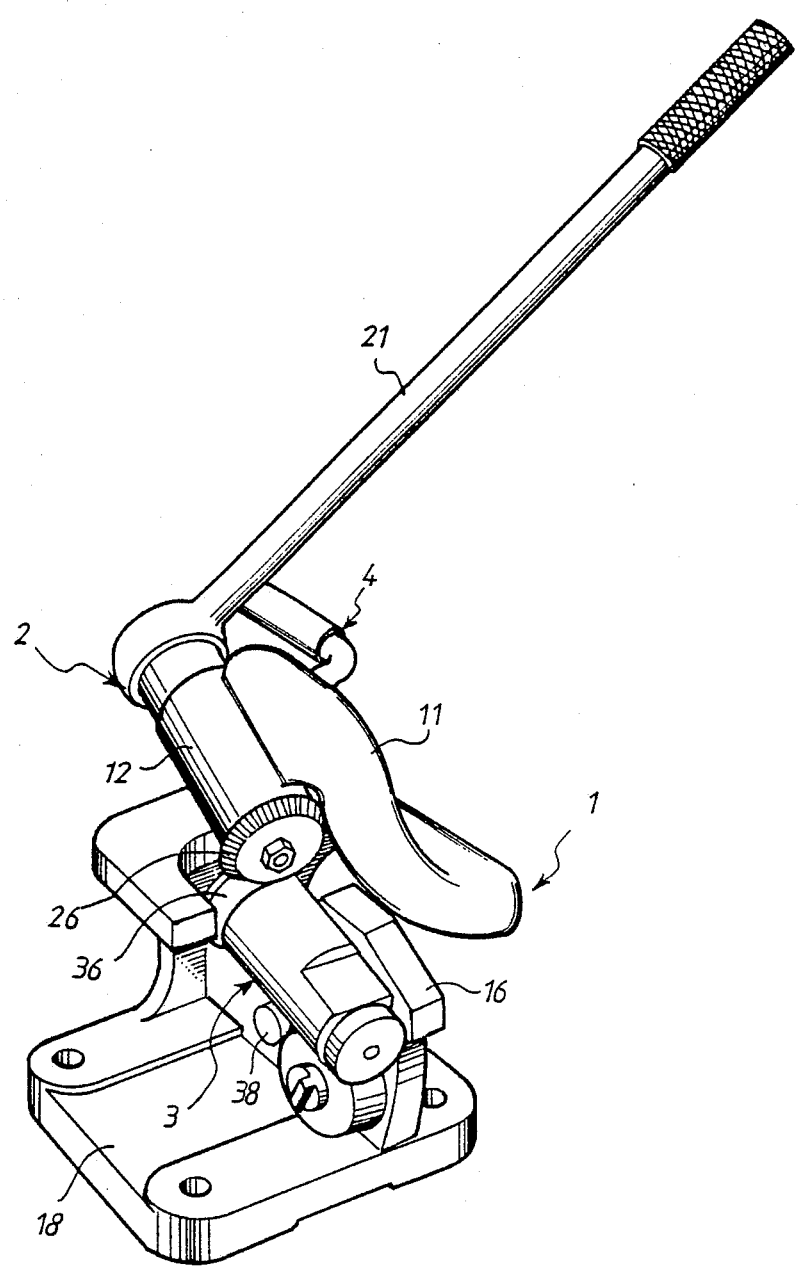
FIG. 1 is an outside view of the plate cutting device in accordance with the invention.
Figure 2:
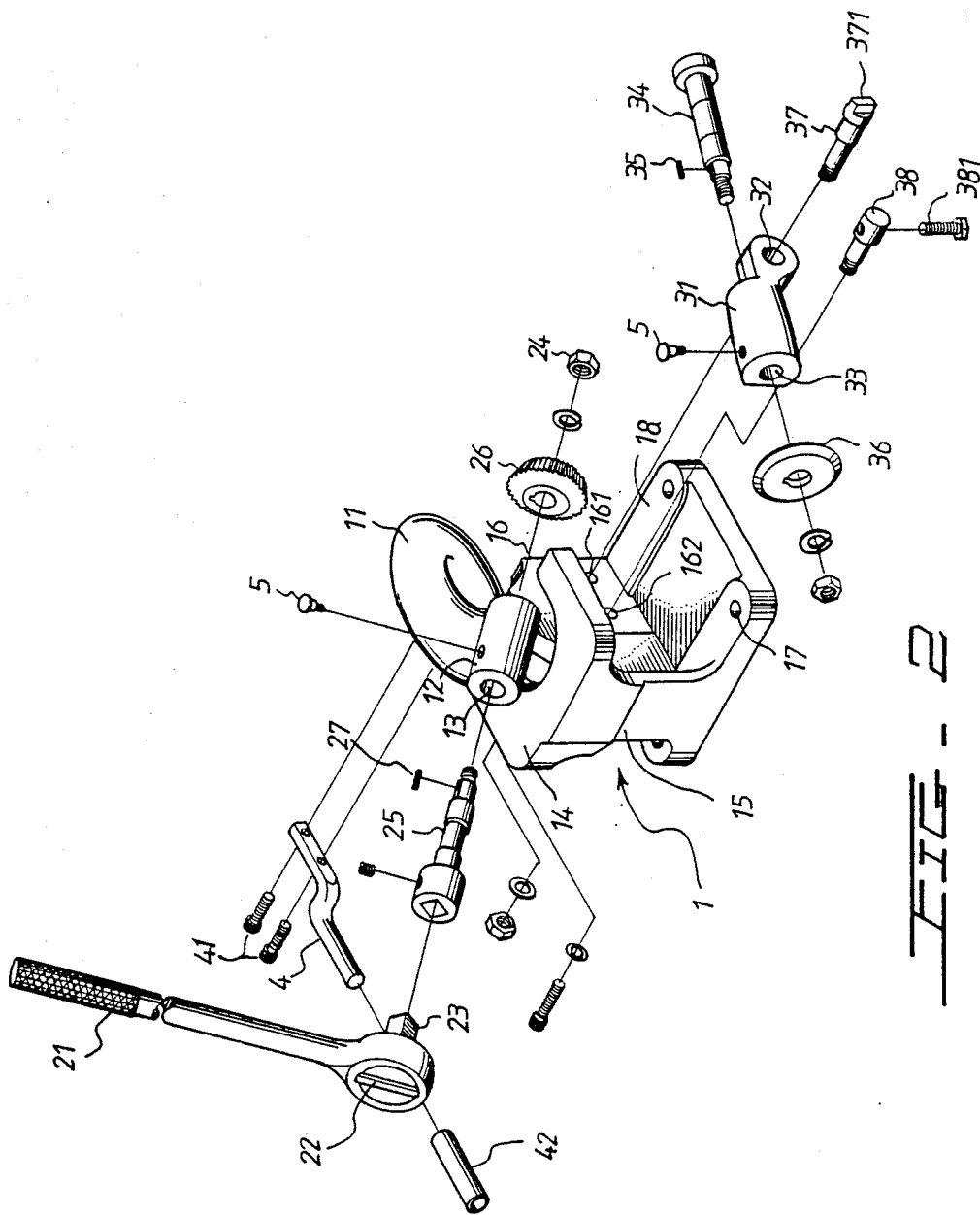
FIG. 2 is a constructionally exploded view of the device.

Referring to FIG. 1, the structure of the device comprises body 1, rolling wheel means 2, cutting wheel means 3, and stop bar 4. Body 1 comprises a base 18 on the top of which are associated body support 15 and slant support 16. At the top end of body support 15 is a U-shaped platform 14. A smoothly curved frame 11 is extended from one arm of U-shaped platform and is attached with a rolling wheel supporting barrel 12. Each of the four corners of base 18 is formed with a hole through which a bolt can be used to secure the device to the ground or foundation. Rolling wheel means comprises ratchet rotating lever 21, direction changing knob 22 and square column 23 associated with the ratchet, bolt 25 formed with a square hole, a key way and a length of thread, a toothed rolling wheel 26 and the related securing nut 24. Cutting wheel means comprises cutter supporting barrel 31 in which is formed a through hole 33 and at the rear end of which is formed an adjusting hole 32, bolt 34 formed with a key way and a length of thread, key 35, cutting wheel 36, eccentricity adjusting bolt 37, supporting bolt 38 and screw 381.

This invention is featured by the combinations of the aforesaid elements which will be described as follows:

Rolling wheel means is constructed by inserting square column 23 associated with ratchet rotating lever 23 into the square hole of bolt 25, securely combining them by a small screw, inserting bolt 25, which has been combined with ratchet rotating lever 21, into bolt hole 13 so that its trailing end is protruded the hole and inserted through toothed rolling wheel 26, then combining bolt 25 and wheel 26 with key 27 and securing the end with nut 24.

Cutting wheel means is constructed by inserting bolt 34 through hole 33 in cutting wheel supporting barrel 31 so that cutting wheel 36 can be engaged with key 35 and bolt 34 at one end of the latter and can be secured by a nut, telescopically engaging eccentricity adjusting bolt 37 with adjusting hole at the rear end of cutting wheel supporting barrel 31, inserting the trailing end of bolt 37 through hole 161 in slant support 16, and then securing bolt 37 with a nut at the opposite side of slant support 16. Moreover, at a suitable position beneath cutting wheel supporting barrel 31 which has been engaged with slant support 16 is provided a supporting bolt 38 within threaded hole in support 16. Supporting bolt 38 is formed with a threaded hole in its head into which can be threaded with a screw 381.

Stop bar 4 is securely engaged with the rear side of curved frame 11 by two securing screws 41. The object of providing stop bar 4 is to prevent ratchet rotating lever 21 from sliding downwardly to the ground. The head of stop bar 4 is covered with plastic cover 42 to avoid the damage due to the impact between lever 21 and bar 4.

Two oil cups are provided respectively on rolling wheel supporting barrel 12 and cutting wheel supporting barrel 31 so that lubricant can be fed between barrel 12 and bolt 25 and between barrel 31 and bolt 34 to reduce the rotational friction. Thereby, the device can be operated smoothly and can be used for a long time.

Referring to FIG. 4, before plate work, a curve can be drawn on plate 6. Then the plate can be put on platform 14 and can be pushed between toothed rolling wheel 26 and cutting wheel 36. In operation of the device, ratchet rotating lever 21 is swung forward and backward so that toothed rolling wheel 26 is rotated intermittently in a single direction. The teeth on wheel 26 can grab plate 6 and can be tangent to the cutting edge of wheel 36. Plate 6 will be cut along the points thereof passing the tangent point between the two wheels 26 and 36, as shown in FIG. 5. The cut part 61 of plate 6 can be moved continuously on platform 14 and the cut-out material 62 can be sent out beneath curved frame 11 so that the latter will not interfere with part 61.

Cutting wheel supporting barrel 31 and rolling wheel supporting barrel 12 secured to slant support 16 are at an angle to each other, as shown in FIG. 4. If this angle is increased, then the tangent area between rolling wheel 26 and cutting wheel 36 will be reduced. In this case, the device can be used to cut along a curve more smoothly, but a larger force must be exerted to cut the plate; if the angle is reduced or even reduced to zero, then the tangent area between rolling wheel 26 and cutting wheel 36 will be increased. In this case, it is harder to cut the plate smoothly, but a smaller force can be exerted to cut the plate. According to research and experiment, the angle of about 10 can lead to desirable results. Therefore, the most preferable effect in cutting apart or cutting along a curve can be achieved by providing slant support 16 at a slant angle of 10.

Figure 3:
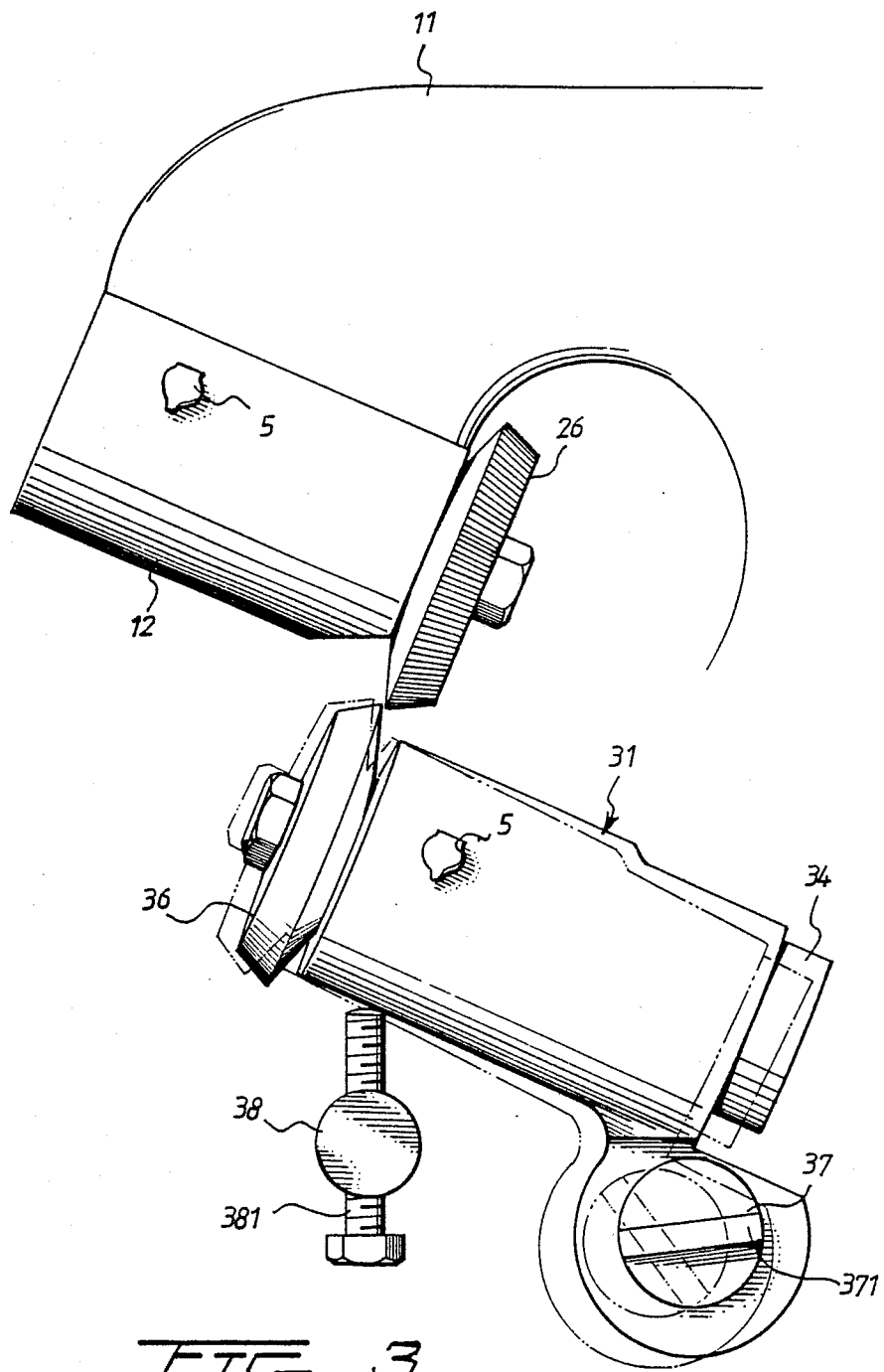
FIG. 3 is a schematic view illustrating the relative position of the toothed rolling wheel and the cutting wheel in accordance with the invention.

Referring to FIG. 3, the distance between the teeth edge of rolling wheel 26 and the cutting edge of cutting wheel 36 can be decomposed into vertical distance A and horizontal distance B. With larger A and B, the device can be used to cut a thicker plate; with smaller A and B, the device is suitable for cutting a thinner plate. The purpose of providing eccentricity adjusting bolt 37 at the rear end of barrel 31 is to by small increment the vertical distance A and horizontal distance B between cutting wheel 36 and toothed rolling wheel 26 so that metallic plates of various thickness can be cut by the device. The adjustment can be done by loosening the nut at the trailing end of bolt 37 first, threading downwardly screw 381 of supporting bolt 38 until it will not interfere with the adjustment of the position of supporting barrel 31, utilizing the eccentric means of eccentricity adjusting barrel 37 by rotating knob 371 so that cutting wheel supporting barrel 31 is displaced forwardly or backwardly and upwardly or backwardly until it reaches the desired position, threading tightly the nut at the trailing end thereof, and then adjusting upwardly screw 381 of supporting bolt 38 until it props against supporting barrel 31.

It is to be understood that the invention is not to be limited to the specific form or arrangement of parts described and shown above. Those who are skilled in the art may devise other modifications or changes without departing from the scope of the invention.

I claim:

1. A plate cutting device capable of being used to cut a plate along a curve comprising;
    a body portion, comprising;
        a square base;
        a body support mounted on said square base;
        a slant support mounted on said square base;
        a U-shaped platform mounted on said body support;
        a smoothly curved frame extending from one arm of said U-shaped platform;
        and a rolling wheel supporting barrel attached to one end of said smoothly curved frame;
        a rolling wheel means connected to said rolling wheel supporting barrel comprising;
            a rolling wheel connected to one end of said rolling wheel supporting barrel; and
            a ratchet rotating lever means connected to said rolling wheel through the other end of said wheel supporting barrel;
    a cutting wheel means secured to the said slant support comprising;
        a cutting wheel supporting barrel;
        a cutting wheel connected to said cutting wheel supporting barrel;
        an eccentricity adjustable bolt connecting said cutting wheel supporting barrel to said slant support;
        said eccentricity adjustable bolt adjusting the vertical and horizontal positions of said cutting wheel means; and a supporting bolt threaded into said slant support below and supporting said cutting wheel support barrel;
    a bent stop bar secured to said smoothly curved frame; and
    wherein said plate cutting device is capable of cutting plates of various shapes, thickness and sizes along straight or curved lines.

2. The plate cutting device in accordance with claim 5 wherein said stop bar is covered with a plastic cover to avoid damage due to the impact between said ratchet rotating lever means and said stop bar.

3. The plate cutting device in accordance with claim 5 further including first and second oil cups respectively provided on said rolling wheel supporting barrel and said cutting wheel supporting barrel for providing lubricant to each of said barrels.

4. A plate cutting device in accordance with claim 5, wherein each of the four corners of the base of said body portion is formed with a hole through which a bolt can be used to secure the device to the ground or foundation.

5. A plate cutting device in accordance with claim 5, wherein said ratchet rotating lever means is provided with a direction changing knob to adjust the rotational direction of the ratchet relating lever means so that during the plate work, the plate can be withdrawn from the device.

6. A plate cutting device in accordance with claim 5 wherein said cutting wheel means is at an angle of about 10° to said slant support so that the combination of said cutting wheel and said rolling wheel means provides an optimum cutting effect.

* * * * *